United States Patent [19]

Lowe, Jr. et al.

[11] Patent Number: 4,930,443
[45] Date of Patent: Jun. 5, 1990

[54] ANIMAL LITTER COMPOSITION

[75] Inventors: H. Edward Lowe, Jr., 21525 Allegheny St., Cassopolis, Mich. 49031; Marvin L. Raymond, Cape Giradeau, Mo.

[73] Assignee: H. Edward Low, Jr., Cassopolis, Mich.

[21] Appl. No.: 281,648

[22] Filed: Dec. 9, 1988

[51] Int. Cl.$^5$ ............................................. A01K 1/015
[52] U.S. Cl. ........................................ 119/1; 424/76.8
[58] Field of Search .................... 119/1; 514/183, 188; 424/76.8

[56] References Cited

U.S. PATENT DOCUMENTS 4,311,512  1/1982  Schwartz ............................ 514/183

Primary Examiner—John Weiss
Attorney, Agent, or Firm—Thomas J. Dodd

[57] ABSTRACT

Animal litter which includes a bacterial and fungal growth inhibitor sprayed onto the litter prior to packaging. The inhibitor may consist of a complex halocarbon material in an aqueous solution which when spayed on the litter liberates free halogens to control bacterial and fungal growth. Other bacterial inhibitors may also be used.

8 Claims, No Drawings

ANIMAL LITTER COMPOSITION

FIELD OF THE INVENTION

This invention relates to improved animal litter and will have application to litter material which contains an additive to sanitize the litter and to effectively control the growth of germs and bacteria during litter use.

BACKGROUND OF THE INVENTION

Previously, it was thought that simple drying of clay-based animal litter products would kill any bacteria present to sanitize the litter prior to packaging. Recently, some producers of animal litter have taken to adding or applying various chemicals to the litter in an effort to sanitize the litter and inhibit growth of odor causing bacteria and fungi.

U.S. Pat. No. 3,636,927 discloses the addition of camphane derivatives to animal litter for use as odor inhibitor.

U.S. Pat. No. 4,494,482 discloses the addition of halogenated aromatic hydrocarbons to the animal litter which act as a bacteriostat.

U.S. Pat. No. 4,622,920 discloses the addition of alkylated phenolic esters to clay and gypsum litters to act as an odor inhibitor.

The above products and others currently available all suffer from one or several use deficiencies. First, they do not effectively control the growth of bacterial and fungal spores after moisture has been absorbed by the litter. Second, many of the previous chemicals used in treating the litter are toxic to both humans and animals and could create serious health problems through long term usage. Also, the chemicals recited are not readily applied to animal litter products.

SUMMARY OF THE INVENTION

The animal litter of this invention is treated prior to packaging with an aqueous solution of a polyoxyalkylene complex and a biocide. Preferably, the chemical used will be a polyvinylpyrrolidone iodine (PVPI) complex which is dissolved in water and sprayed onto the litter to liberate free iodine molecules. The iodine acts as a bacterial and fungal growth inhibitor, and is safe for use by both humans and animals. Other biocidal complexes may also be used. These complexes include polyoxyalkylene/iodine, chlorhexidine gluconate, chlorhexidine diacetate, hydroxyacetic acid, and quaternary amines.

Accordingly, it is an object of this invention to provide for a sanitized germ free animal litter product.

Another object is to provide for an animal litter product which controls bacterial and fungal growth during animal use.

Another object is to provide for an animal litter product which is safe to handle and use.

Still another object is to provide for an animal litter additive which controls bacterial and fungal growth and which is easily applied to the litter prior to packaging.

Still another object is to provide for an animal litter additive which is stable and not harmful to humans or animals.

Other objects of the invention will become apparent upon a reading of the following description.

DESCRIPTION OF THE PREFERRED EMBODIMENT

The preferred embodiments of the invention described herein are not intended to be exhaustive or to limit the invention to the precise details or materials given. They are furnished and described to allow those skilled in the art to practice the invention pursuant to the current state of the art.

According to the teachings of this invention, there is provided a sanitized animal litter which contains an additive to inhibit growth of bacteria and fungal spores before, during and after use by the animal. The most common application of the litter will be found in domestic cat boxes, but all practical uses of animal litters will have application to the formulations described below.

The litter may consist of any commercially available materials used for this purpose. The litter material may be formed of inorganic minerals, such as the various clays, bentonite, dolomite or other materials, or may be of an organic fiber base, such as wood fiber, pulp, alfalfa, paper sludge or other organic materials. The additive will be useful with all types of litter regardless of their composition and physical properties.

The additive is preferably formed from a material which is soluble in water or other non-toxic solvent, and which liberates a quantity of a biocidal material shortly after application to the litter in an aqueous solution. One preferred additive consists of an aqueous solution of 15% by weight of polyvinylpyrrolidone iodine (PVPI) complex which yields about 1.5% of free iodine for use as a microbial control. Other preferred additives which may be useful as bacterial and fungal growth inhibitors are polyoxyalkylene complexes with iodine, chlorhexidine gluconate (CHG), chlorhexidine diacetate, hydroxyacetic acid (HAA), and quaternary amines. In all cases, the aqueous solution preferably includes no more than 35% by weight of the additive, or an amount sufficient to saturate the solution.

The additive is preferably applied to the litter by spraying the aqueous solution of the complex directly on the animal litter. The amount of the additive sprayed onto the litter is controlled by conventional means and is preferably set so that about 5-500 ppm of the biocide are liberated as the water evaporates. The following examples are indicative of the various complexes and their function in inhibiting microbial growth in animal litter products.

EXAMPLES 1-8

Five pounds of mineral grade clay granules were sprayed with a biocidal material (PVPI or HAA dissolved in 100-200 ml. of water) according to the following charts and tested in a cattery by filling a cat litter box with the treated clay granules and allowing cats to use the same. Each box was measured for bacterial and fungal growth after 24 hours, 72 hours, 1 week and 2 weeks. The following scale was used in detecting bacterial and fungal growth:

NG—No growth detected
+1—Very light growth
+2—Light growth
+3—Moderate growth
+4—Heavy growth

| Example | Biocide Used | Amount of Biocide Used | Concentration (By weight of Clay) |
| --- | --- | --- | --- |

-continued

| | | | |
|---|---|---|---|
| 1 | None (Control) | 0 | 0 |
| 2 | PVPI | 0.57 g | 250 ppm (0.025%) |
| 3 | PVPI | 2.27 g | 1000 ppm (0.1%) |
| 4 | PVPI | 4.54 g | 2000 ppm (0.2%) |
| 5 | PVPI | 11.40 g | 5000 ppm (0.5%) |
| 6 | HAA | 0.81 g | 250 ppm (0.025%) |
| 7 | HAA | 3.2 g | 1000 ppm (0.1%) |
| 8 | HAA | 16.3 g | 5000 ppm (0.5%) |

| Example | 24 hours | 72 hours | 1 week | 2 weeks |
|---|---|---|---|---|
| | Bacterial Growth | | | |
| 1 | NG | NG | +1 | 4 |
| 2 | +1 | +1 | NG | NG |
| 3 | NG | NG | +1 | +4 |
| 4 | NG | NG | +1 | NG |
| 5 | +1 | NG | NG | +2 |
| 6 | NG | NG | NG | +3 |
| 7 | NG | NG | NG | NG |
| 8 | NG | NG | NG | NG |
| | Mycological Growth (NFI = No Fungus Isolated) | | | |
| 1 | NFI | +2 | NFI | +2 |
| 2 | +1 | +1 | NFI | NFI |
| 3 | NFI | NFI | NFI | NFI |
| 4 | NFI | NFI | NFI | +1 |
| 5 | +1 | NFI | NFI | NFI |
| 6 | NFI | NFI | NFI | NFI |
| 7 | NFI | NFI | NFI | NFI |
| 8 | NFI | NFI | NFI | NFI |

EXAMPLES 9–15

Five pounds of clay were sprayed with an aqueous solution of CHG and the results observed:

| Example | Biocide Used | Amount of Biocide Used | Concentration (By weight of Clay) |
|---|---|---|---|
| 9 | None (Control) | 0 | 0 |
| 10 | CHG | 57 g (20% soln.) | 0.5% |
| 11 | CHG | 11.4 g (20% soln.) | 0.1% |
| 12 | CHG | 5.7 g (20% soln.) | 0.05% |
| 13 | CHG | 1.14 g (20% soln.) | 0.01% |
| 14 | CHG | 0.114 g (20% soln.) | 0.001% |
| 15 | CHG | 114 g (10% soln.) | 0.5% |

| Example | 24 hours | 72 hours | 1 week | 2 weeks |
|---|---|---|---|---|
| | Bacterial Growth | | | |
| 9 | +2 | NG | NG | +3 |
| 10 | NG | NG | NG | +4 |
| 11 | NG | NG | +2 | +1 |
| 12 | NG | NG | +4 | +4 |
| 13 | NG | NG | NG | +4 |
| 14 | NG | NG | NG | +2 |
| 15 | NG | NG | NG | +1 |
| | Fungal Growth | | | |
| 9 | NG | NG | NG | +2 |
| 10 | NG | NG | +1 | +2 |
| 11 | NG | NG | NG | +1 |
| 12 | NG | NG | +2 | +2 |
| 13 | NG | NG | +2 | +1 |
| 14 | NG | NG | NG | NG |
| 15 | NG | NG | NG | NG |

EXAMPLES 16–22

Five pounds of clay were sprayed with 1.7 grams of Moncap fragrance oil (Bush Boake Allen (BBA) #871440) and aqueous PVPI and the following results observed:

| Example | PVPI Conc. (By Weight of Clay) | 24 hours | 72 hours | 1 week | 2 weeks |
|---|---|---|---|---|---|
| | Bacterial Growth | | | | |
| 16 | 0 (Control) | NG | +2 | +4 | +4 |
| 17 | 0.005% | +1 | NG | NG | +4 |
| 18 | 0.01% | NG | +1 | NG | +3 |
| 19 | 0.025% | NG | +1 | +4 | +4 |
| 20 | 0.05% | +1 | +1 | +4 | +4 |
| 21 | 0.075% | NG | +1 | NG | +2 |
| 22 | 0.1% | NG | NG | +4 | +4 |

| Example | 24 hours | 72 hours | 1 week | 2 weeks |
|---|---|---|---|---|
| | Fungal Growth | | | |
| 16 | NG | +1 | +4 | +4 |
| 17 | NG | NG | +2 | +4 |
| 18 | NG | NG | NG | +4 |
| 19 | NG | +1 | +3 | +2 |
| 20 | +1 | +1 | +3 | +1 |
| 21 | +4 | +3 | +2 | +1 |
| 22 | +1 | +4 | +4 | +2 |

EXAMPLES 23–29

Five pounds of clay were sprayed with 1.25 g of SOK fragrance (BBA oil with germicide) and HAA and the following results observed:

| Example | HAA Conc. (By Weight of Clay) | 24 hours | 72 hours | 1 week | 2 weeks |
|---|---|---|---|---|---|
| | Bacterial Growth | | | | |
| 23 | 0 (Control) | +1 | NG | +1 | +3 |
| 24 | 0.01% | +1 | NG | +4 | +1 |
| 25 | 0.05% | +1 | NG | +1 | +1 |
| 26 | 0.1% | NG | NG | +2 | +4 |
| 27 | 0.25% | NG | +1 | +2 | +1 |
| 28 | 0.5% | +1 | NG | +4 | +3 |
| 29 | 1.0% | NG | +1 | +2 | +3 |

| Example | 24 hours | 72 hours | 1 week | 2 weeks |
|---|---|---|---|---|
| | Fungal Growth | | | |
| 23 | NG | NG | +1 | +1 |
| 24 | NG | +1 | +4 | +4 |
| 25 | NG | +1 | NG | NG |
| 26 | +1 | NG | NG | NG |
| 27 | NG | +1 | NG | +1 |
| 28 | NG | NG | NG | NG |
| 29 | NG | NG | +4 | +4 |

It is to be understood that the above descriptions are not limiting of the invention to those precise details, but may be modified within the scope of the following claims.

What is claimed is:

1. Animal litter comprising a quantity of absorbent granular materials, said granular materials including a biocidal additive incorporated therein, said additive constituting means for inhibiting microbial growth in said granular materials, said additive consisting of an aqueous solution of a complex ion consisting of an organic compound and a biocidal compound, said aqueous solution applied directly to the litter.

2. The animal litter of claim 1 wherein said organic compound is polyvinylpyrrolidone, said biocidal compound is iodine, and said aqueous solution contains no more than 15% by weight of said complex ion.

3. The animal litter of claim 1 wherein said complex ion consists of one of the group of materials which includes chlorhexidine gluconate, chlorhexidine diacetate, hydroxyacetic acid.

4. The animal litter of claim 1 wherein said additive is applied to said granular materials by spraying said aqueous solution thereon.

5. The animal litter of claim 1 wherein said complex ion is polyvinylpyrrolidone iodine which yields 1.5% free iodine by weight when water from said aqueous solution evaporates after application.

6. The method of claim 1 wherein said granular materials consist of clay based minerals.

7. A method of forming a sanitary animal litter comprising the steps of:
    (a) providing a quantity of an absorbent granular fill material;
    (b) providing an aqueous solution of an additive for inhibiting microbial growth, said additive consisting of an aqueous solution of a complex ion consisting of an organic compound and a biocidal compound; and
    (c) applying said additive to said granular fill material wherein a quantity of said biocidal compound is liberated upon evaporation of water from said aqueous solution.

8. The method of claim 7 wherein step (c) includes applying said additive to said granular fill material by spraying the additive directly onto the granular fill material.

* * * * *